Feb. 4, 1964            G. PETER            3,120,196

CONVEYORS FOR VEHICLES MOUNTED ON WHEELS

Filed April 9, 1962            4 Sheets-Sheet 1

Feb. 4, 1964   G. PETER   3,120,196
CONVEYORS FOR VEHICLES MOUNTED ON WHEELS
Filed April 9, 1962
4 Sheets-Sheet 2
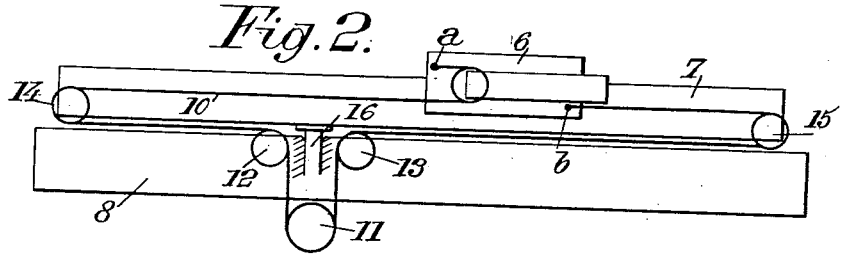
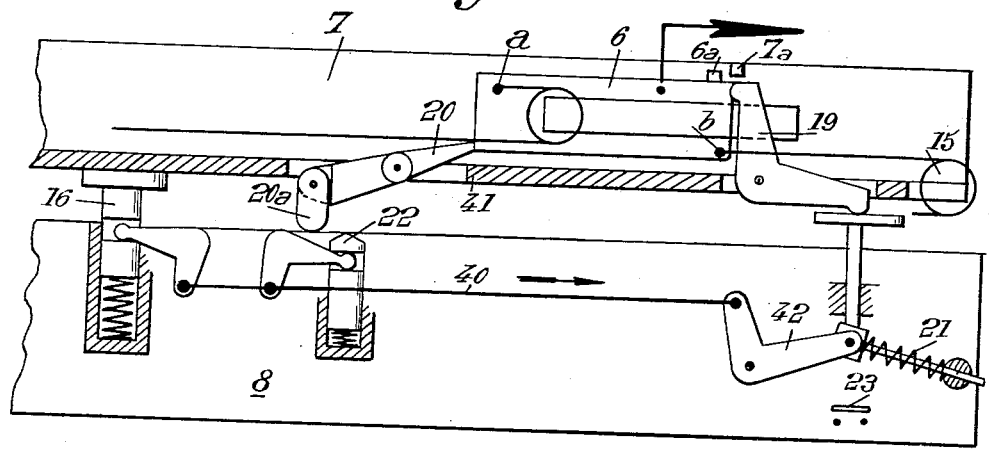
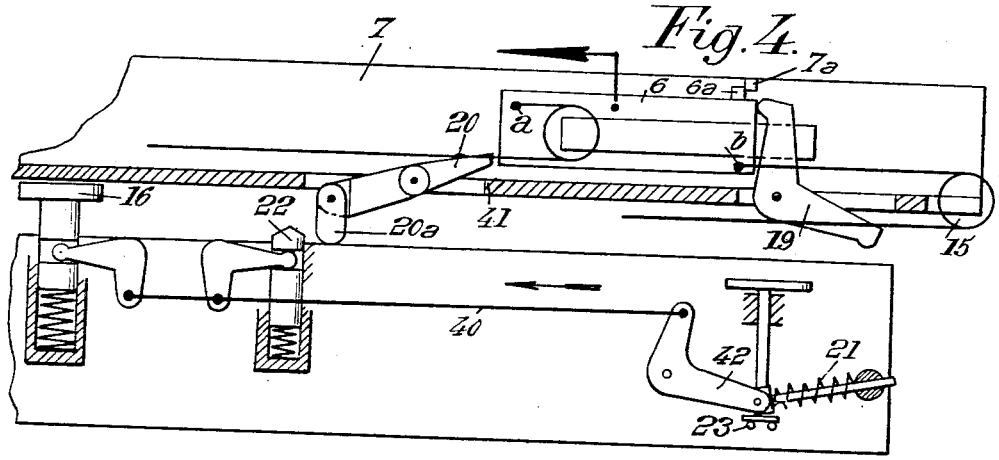

Feb. 4, 1964 G. PETER 3,120,196
CONVEYORS FOR VEHICLES MOUNTED ON WHEELS
Filed April 9, 1962 4 Sheets-Sheet 3
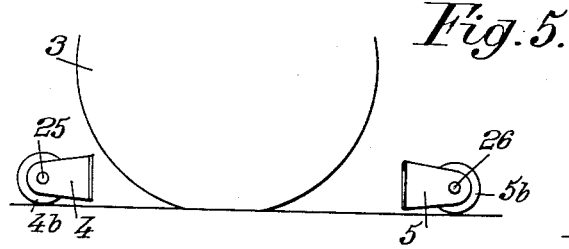
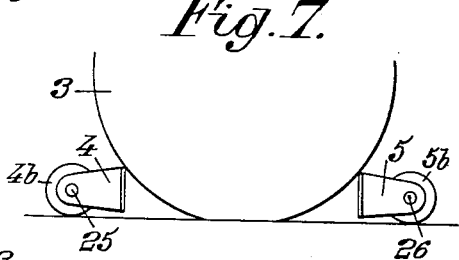
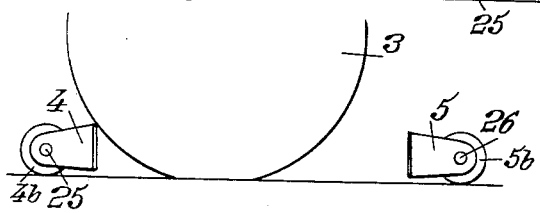
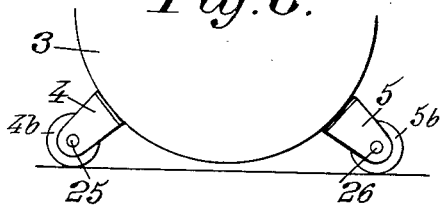
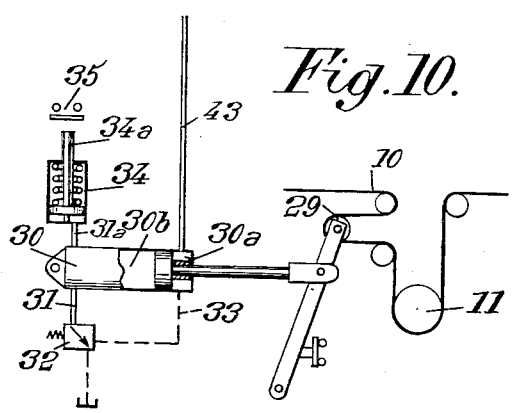

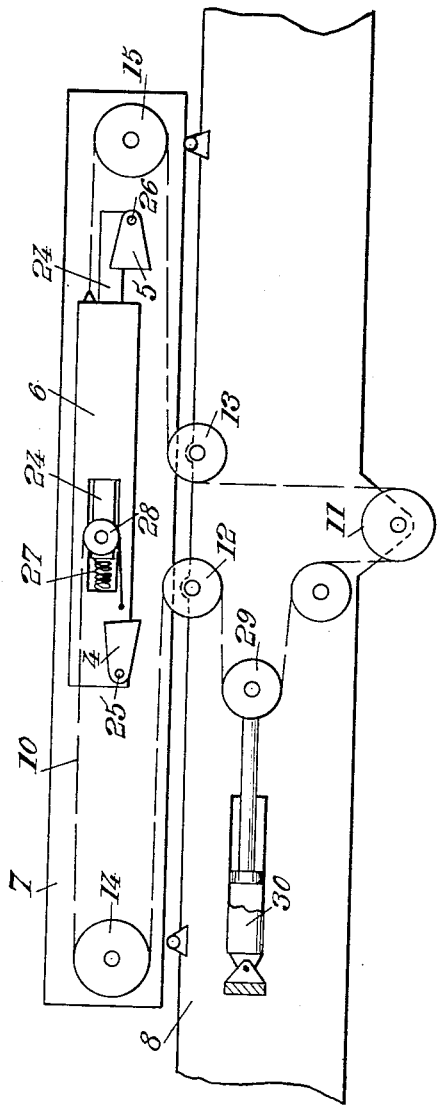

United States Patent Office 3,120,196
Patented Feb. 4, 1964

3,120,196
CONVEYORS FOR VEHICLES MOUNTED ON WHEELS
Gilbert Peter, 87 Rue du Garde-Chasse, Les Lilas, Seine, France
Filed Apr. 9, 1962, Ser. No. 186,042
Claims priority, application France Apr. 13, 1961
6 Claims. (Cl. 104—172)

The present invention relates to conveyors for vehicles mounted on wheels, i.e. to devices for displacing such vehicles over relatively short distances by means of an external energy and without making use of the vehicle engine in the case of a motor vehicle. The invention is more especially but not exclusively concerned with conveyors for motor vehicles.

The chief object of my invention is to provide a conveyor capable of meeting the requirements of practice.

The conveyors with which the present invention is concerned comprise two holding means adapted to be brought respectively at the front and at the rear of a wheel of the vehicle and to engage the periphery of this wheel at the front and at the rear of the vertical plan of its axis and at a level lower than that of said axis, said holding means being movable toward each other so as to catch the wheel between them.

According to the present invention the movement of said means relatively to each other is a rectilinear movement, one of said means being mounted on a carriage and the other on a member slidable on said carriage in the direction of said rectilinear movement.

Other features of the present invention will become apparent in the course of the following detailed description of an embodiment thereof with reference to the appended drawings, given merely by way of example, and in which:

FIG. 2 is a diagrammatic side view illustrating the system for controlling a carriage and a sliding beam belonging to said conveyor;

FIGS. 3 and 4 show, in a more detailed fashion, said control system, at two different times of its operation;

Figure 1:
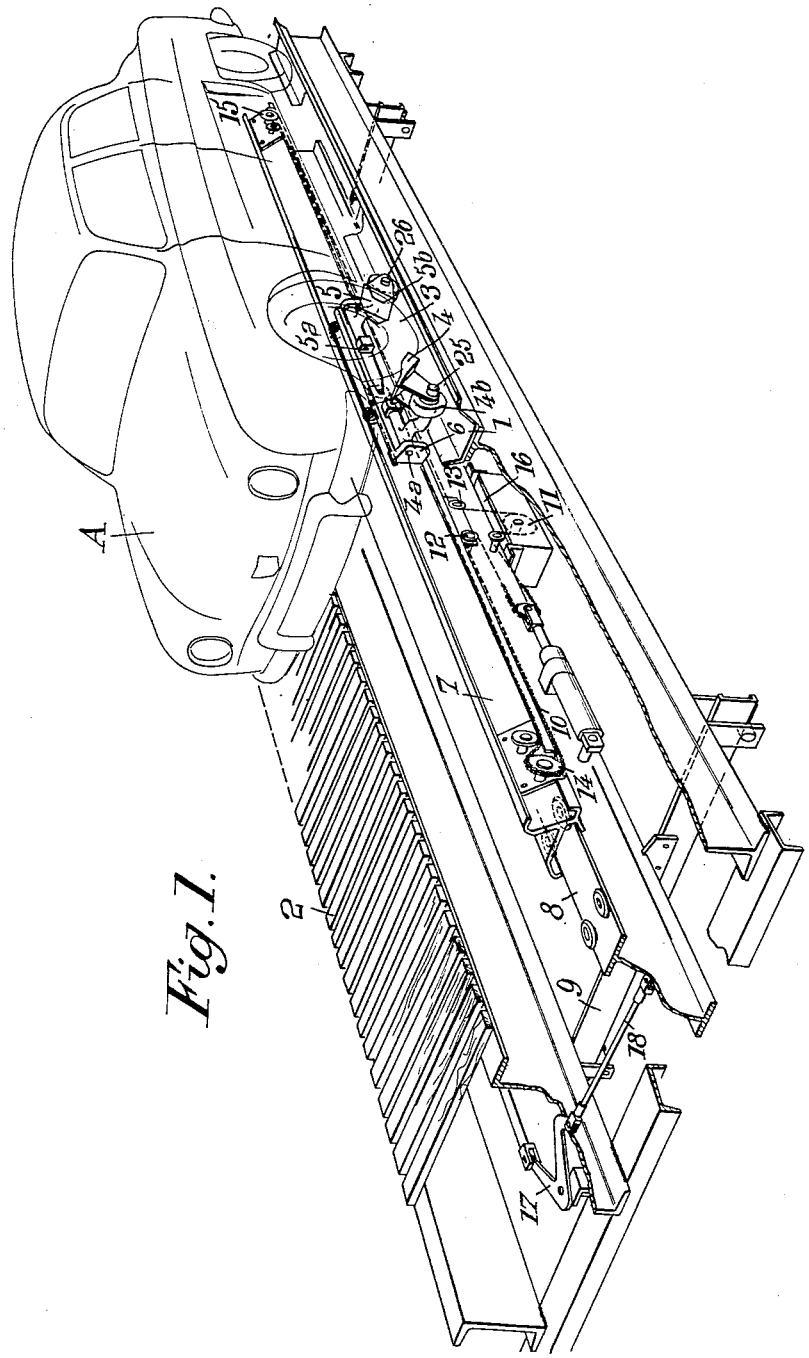
FIG. 1 is a perspective view, with parts cut away, of a conveyor for motor vehicles made according to the present invention.

FIGS. 5 to 8 inclusive diagrammatically show four successive relative positions of the wheel holding means of the conveyor;

FIG. 9 is a diagrammatical view of the system for controlling the holding means;

FIG. 10 shows a modification of the system of FIG. 9.

The conveyor illustrated by the drawings comprises, as shown by FIG. 1, the following elements:

On the one hand, there is provided a kind of rail 1, the upper portion of which has a concave cross-section so as to form an upwardly turned gutter-like track for guiding the wheels of a vehicle A located on one side of said vehicle; and On the other hand, there is provided a flat track 2 parallel to rail 1, said track 2 being positioned and made of such a width that, when the wheels on one side of vehicle A are lying in said rail 1, the wheels of the vehicle located on the other side thereof rest upon said flat track 2.

The conveyor further comprises two holding means, or shoes, 4 and 5, adapted to be brought respectively at the front and at the rear of one of the wheels (for instance the front wheel on the left hand side of vehicle A, said wheel being located in rail 1) and to be moved toward each other so as to catch the wheel between them at a level lower than that of the axis of said wheel 3, for instance at mid-distance between the ground and said axis.

Said holding shoes 4 and 5 are mounted on a carriage 6 which may have two kinds of movements, to wit, a movement in the longitudinal direction, i.e. parallelly to rail 1, and a transverse movement, so that it is possible, by means of a suitable control system, to engage carriage 6 between the front wheels of vehicle A, and then to move said carriage transversely so that shoes 4 and 5 come respectively at the front and at the rear of the left front wheel 3.

Before describing the operation of said shoes 4 and 5, I will first describe a system for controlling the displacements of carriage 6 with respect to rail 1.

According to the construction illustrated by FIGS. 1 and 2, carriage 6 is movable along a beam 7, itself slidable along a girder 8 having a vertical web, disposed between rail 1 and track 2.

Girder 8 is supported by transverse members 9 and is slidable in the traverse direction with respect to rail 1.

The displacements of carriage 6 along beam 7 and the sliding displacements of said beam 7 along girder 8 are effected by means of a mechanism comprising a chain 10 driven by a sprocket wheel 11 mounted in girder 8.

The two ends of said chain are secured to carriage 6 respectively at $a$ and $b$ (FIG. 2), said chain passing over two pulleys 12 and 13 carried by girder 8 and over two pulleys 14 and 15 carried by sliding beam 7.

A locking device 16 permits of temporarily fixing sliding beam 7 with respect to girder 8 in order to permit of moving carriage 6 along said sliding beam 7.

Another control mechanism is provided to produce the transverse displacements of girder 8 with respect to rail 1, which bring carriage 6 into the position where shoes 4 and 5, mounted on said carriage, come respectively at the front and at the rear of a vehicle left wheel, such as 3. This last mentioned mechanism comprises a double action hydraulic ram (not shown) operatively connected with the transverse members 9 that support beam 8, a bell-crank lever 17, and a transmission rod 18 for transmitting the motion of said ram to said girder 8.

A positioning device for temporarily preventing movement of carriage 6 with respect to sliding beam 7 is provided, together with means for operatively connecting said positioning device with the locking device 16. Said connecting means are arranged in such manner that sliding beam 7 is locked in fixed position with respect to girder 8 by locking device 16 as long as carriage 6 has not reached a position near one of the ends of sliding beam 7, and that, as soon as said carriage has reached said position, it is prevented from moving with respect to sliding beam 7 whereas said beam is released with respect to girder 8, these two simultaneous operations taking place at the same time as a reversal of the movement of rotation of driving sprocket wheel 11.

This arrangement is more especially visible on FIGS. 3 and 4.

The device for positioning carriage 6 on sliding beam 7 comprises on the one hand, and near the end of sliding beam 7, a pawl 20, adapted to prevent carriage 6, when it has moved outwardly past said pawl, from moving back toward the central part of sliding beam 11 and on the other hand, a pair of cooperating abutments 6a and 7a respectively carried by carriage 6 and sliding beam 7 and intended to prevent carriage 6 from moving outwardly beyond a given position at the end of sliding beam 7.

Sliding beam 7 carries a pivoting lever 19 adapted to be struck by carriage 6 moving outwardly, so as to operate a snap action trip mechanism comprising a spring 21, this mechanism being connected through a rod 40 with locking device 16, so as to place it out of action, and with a retractable abutment 22 so as to cause it to project across the path of travel of the pivotally mounted heel 20a of pawl 20. The snap action trip mechanism further operates a contactor 23 capable of reversing the direction of movement of the driving sprocket wheel 11.

FIG. 3 shows the elements above referred to when carriage 6, nearing the end of its outward movement along sliding beam 7 (in the direction of the arrow) and having passed beyond pawl 20, is going to swing lever 19 to operate the snap action trip mechanism so as to release locking device 16.

When said snap action mechanism is operated, rod 40 is pulled in the direction of the arrow and causes locking device 16 to be retracted, thus releasing sliding beam 7 and causing abutment 22 to project upwardly. At the same time, contactor 23 is operated to reverse the direction in which driving wheel 11 is rotating.

As a consequence of this, carriage 6 ceases to be pulled toward the right by chain 10 secured to point b thereof and, on the contrary, this chain pulls said carriage toward the left. As carriage 6 is prevented by pawl 20 from moving toward the left with respect to sliding beam 7, so that the a end of chain 10 is thus fixed with respect to said beam 7, sprocket wheel 11, which is now turning in the clockwise direction, pulls pulley 14 (FIG. 2), carried by beam 7, toward the right and beam 7, which has now been released by locking device 16, is moved toward the right, together with carriage 6, fixed thereon by the fact that it is urged against pawl 20.

When this movement, intended to move carriage 6 to the outside of the platform on which tracks 1 and 2 are mounted, has reached the desired amplitude, the movement of the motor by which sprocket wheel 11 is driven is stopped, for instance by the operator of the conveyor. The holding shoes 4 and 5 of the carriage are then operated (either to release the wheel of a vehicle that has been removed from the platform or on the contrary to catch the wheel of a vehicle that is to be brought onto said platform).

Then beam 7 and carriage 6 are to be returned on said platform. For this purpose, the operator of the conveyor starts the electric motor that drives sprocket wheel 11 in the direction opposed to the preceding direction of running of said motor, so that sprocket wheel 11 is now turning in the clockwise direction.

Carriage 6 would then tend to move toward the right with respect to beam 7. But abutments 6a, 7a, respectively carried by the carriage and the beam, prevent this movement. Carriage 6 being thus fixed to beam 7 so that the end b of chain 10 is fixed with respect to said beam, sprocket wheel 11, rotating in the clockwise direction, pulls pulley 15 (FIG. 2) carried by beam 7 toward the left, and beam 7 is made to slide in this direction.

FIG. 4 shows the parts of the conveyor when the heel 20a of pawl 20 is just going to reach abutment 22 (which has remained in the upper position). Heel 20a first rides up the sloping face of said abutment 20a, thus pivoting pawl 20 sufficiently to clear the path of carriage 6. But, as soon as pawl 20 has released carriage 6, this pawl comes into contact with an abutment 41 carried by beam 7. Pawl 20 can no longer pivot in the clockwise direction and its heel 20 can no longer move upwardly. Abutment 22 is now compelled to yield by moving downwardly.

Through link 40, this movement of abutment 22 has two consequences. On the one hand, it causes locking member 16 to move upwardly, thus locking beam 7 in position and, on the other hand, it returns the snap action mechanism back into its initial position, thus once more operating contactor 23 to reverse the direction of rotation of sprocket wheel 11, so that this wheel now turns in anticlockwise direction.

The end a of chain 10 now pulls toward the left carriage 6 (which has been released from beam 11 now locked in position by device 16) so as to return said carriage toward the position from which it has been supposed to start.

The holding shoes 4 and 5 are arranged so that their rectilinear relative movement with respect to each other is parallel to the direction of displacement of carriage 6 on sliding beam 7 and of said beam 7 on girder 8.

One of the shoes, 4, is directly carried and mounted on carriage 6 whereas the other shoe, 5, is mounted on a support 24 slidable longitudinally on said carriage 6. The holding shoes are preferably provided with flanges as visible on FIG. 1.

Furthermore, as visible on FIG. 5, shoes 4 and 5, are pivoted, respectively on carriage 6 and support 24, about transverse spindles 25 and 26 located at a level lower than the upper edge of the surface of said shoes that is to be applied against the wheel tire. Thus, when the shoes are brought into contact with wheel 3, any movement tending to move them further toward each other tends to cause them to swing upwardly and, after they have been applied against the wheel tire, to lift this wheel.

FIGS. 5 to 8 illustrate the operation.

In FIG. 5 shoes 4 and 5 have been brought on opposite sides of the wheel, at the end of the transverse movement of girder 8.

In FIG. 6, shoe 4 is brought into contact with the wheel tire by a longitudinal displacement of carriage 6.

In FIG. 7 the other shoe, 5, is in turn brought into contact with the wheel tire by a longitudinal displacement of the support 24 of said shoe 5.

In FIG. 8 both of the shoes have swung upwardly so as to be applied along the wheel tire by a further displacement of support 24 and wheel 3 has been lifted.

It should be noted that, as shown by FIG. 1, the respective spindles 25 and 26 of shoes 4 and 5 are mounted oscillating about longitudinal axes 4a and 5a. Furthermore, these spindles are provided with bearing rollers 4b and 5b intended to rest on the bottom of hollow rail 1.

In the embodiment of my invention illustrated by the drawings, the relative movement of shoes 4 and 5 toward each other is obtained by means of chain 10, above referred to.

As shown by FIG. 9 there is interposed, between carriage 6 and sliding support 24, a spring 27 urging these two elements away from each other and therefore tending to moves shoes 4 and 5 away from each other.

The end portion of chain 10, which is to be connected to the left hand side of carriage 6, is made to pass about a pulley 28 journalled on the left hand end of sliding support 24.

The portion of chain 10 leaving the left hand side of sprocket wheel 11, instead of passing directly to pulley 12, is made to pass over a pulley 29 journalled on the rod of the piston of a hydraulic ram 30, the cylinder of which is secured to girder 8. Thus when said ram is operated so as to move its piston toward the left, chain 10 is pulled by pulley 29 and sliding support 24 is pulled toward the left with respect to carriage 6, thus moving shoe 5 toward shoe 4.

According to a modification illustrated by FIG. 10, pulley 29 is carried by a lever pivoted to girder 8 at its lower end and having an intermediate point thereof pivotally connected to the piston rod of hydraulic ram 30. To operate said ram, fluid under pressure is fed through conduit 43 into the chamber 30a of the ram. The liquid present in the other chamber 30b of the ram is first driven out through conduit 31. Conduit 31 is controlled by a valve 32 responsive to the pressure existing in ram chamber 30a (through means diagrammatically illustrated by dotted line 33) so that valve 32 is open as long as the pressure in ram chamber 30a does not exceed a given value. This pressure is that necessary to bring shoes 4 and 5 both into contact with the vehicle wheel (position of FIG. 7).

Of course, when starting from this position, the shoes are to be further moved toward each other, the force to be exerted increases considerably and the pressure in ram chamber 30a rises immediately. Since the liquid in ram chamber 30b can no longer flow out through conduit 31, it can only escape through conduit 31a leading to a cylinder 34 in which is slidably mounted a piston the rod of which is shown at 34a. The upward displacement of said rod 34a is in relation with the movement of wheel 3 away from the ground under the effect of the movement of shoes 4 and 5 toward each other.

It is therefore easy to adjust said rod 34a with respect to an electric contactor 35 which starts the motor serving to drive sprocket wheel 11 as soon as the wheel has been lifted to the desired height.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A conveyor for vehicles mounted on wheels to move said vehicles along a given path, which conveyor comprises, in combination, an elongated support extending in the direction of said path, means for moving said support parallel to itself in a direction transverse to said path, a carriage movable along said support, means operatively connecting said carriage with said support for displacing said carriage along said support, a sliding member movably mounted on said carriage for rectilinear movement with respect thereto in a direction parallel to the direction of said support, two holding means, one carried by said carriage and the other by said sliding member, for contacting the periphery of a vehicle wheel respectively on opposite sides of the vertical plane passing through the axis thereof and at a height smaller than that of said axis and means operative from a distance for displacing said sliding member on said carriage to move said holding means toward each other.

2. A conveyor for vehicles mounted on wheels to move said vehicles along a horizontal rectilinear path, which conveyor comprises, in combination, a horizontal platform, a girder extending in the direction of said path movably supported on said platform for movement parallel to itself in a direction transverse to said path, means for moving said girder parallel to itself in said direction transverse to said path, a sliding beam parallel to said girder and movable along it in the direction of said path, a carriage mounted on said beam and movable therealong in said direction, means for producing movement of said carriage with respect to said sliding beam and movement of said sliding beam with respect to said girder so that said movements are exclusive of each other, means for locking said beam with respect to said girder as long as said carriage is at one end of said beam, a sliding member movably mounted on said carriage for horizontal rectilinear movement with respect thereto in the direction of said path, two holding means, one carried by said carriage and the other by said sliding member, for contacting the periphery of a vehicle wheel, respectively at the front and at the rear thereof, at a height smaller than that of the axis of said wheel, and means operative from a distance for displacing said sliding member on said carriage to move said holding means toward each other.

3. A conveyor for vehicles mounted on wheels to move said vehicles along a horizontal rectilinear path, which conveyor comprises, in combination, a horizontal platform, a girder extending in the direction of said path movably supported on said platform for movement parallelly to itself on said platform in a direction transverse to said path, means for moving said girder parallel to itself in said direction transverse to said path, a sliding beam parallel to said girder and movable along it in the direction of said path, a carriage mounted on said beam and movable therealong in said direction, means for producing movement of said carriage with respect to said sliding beam and movement of said sliding beam with respect to said girder so that said movements are exclusive of each other, means for locking said beam with respect to said girder as long as said carriage is at one end of said beam, a sliding member movably mounted on said carriage for horizontal rectilinear movement with respect thereto in the direction of said path, two holding shoes, one pivoted to said carriage about a horizontal axis perpendicular to the direction of said rectilinear movement and the other one pivoted to said sliding member about a horizontal axis perpendicular to the direction of said rectilinear movement, said shoes extending from their respective axes toward each other, each of said shoes having a bearing surface adapted to fit on, and engage, the periphery of a vehicle wheel, the pivot axis of each of said shoes being located at a level lower than that of the top edge of the bearing surface of said shoe, said top edge being itself at a level lower than that of the axis of such a wheel, and means operative from a distance for displacing said sliding member on said carriage to move said shoes toward each other.

4. A conveyor for vehicles mounted on wheels to move said vehicles along a horizontal rectilinear path, which conveyor comprises, in combination, a horizontal platform, a girder extending in the direction of said path movably supported on said platform for movement parallel to itself on said platform in a direction transverse to said path, means for moving said girder parallel to itself in said direction transverse to said path, a sliding beam parallel to said girder and movable along it in the direction of said path, a carriage mounted on said beam and movable therealong in said direction, a single chain mechanism for producing movement of said carriage with respect to said sliding beam and movement of said sliding beam with respect to said girder so that said movements are exclusive of each other, means for locking said beam with respect to said girder as long as said carriage is at one end of said beam, a sliding member movably mounted on said carriage for horizontal rectilinear movement with respect thereto in the direction of said path, two holding shoes, one pivoted to said carriage about a horizontal axis perpendicular to the direction of said rectilinear movement and the other one pivoted to said sliding member about a horizontal axis perpendicular to the direction of said rectilinear movement, said shoes extending from their respective axes toward each other, each of said shoes having a bearing surface adapted to fit on, and engage, the periphery of a vehicle wheel, the pivot axis of each of said shoes being located at a level lower than that of the top edge of the bearing surface of said shoe, said top edge being itself at a level lower than that of the axis of such a wheel, and means operative from a distance for displacing said sliding member on said carriage to move said shoes toward each other.

5. A conveyor according to claim 4 wherein the means for displacing said sliding member on said carriage is operatively connected with said chain mechanism.

6. A conveyor for vehicles mounted on wheels to move said vehicles along a hoizontal rectilinear path, which conveyor comprises, in combination, a horizontal platform, a fixed rail carried by said platform and extending in the direction of said path, a girder extending in the direction of said path movably supported on said platform for movement parallelly to itself on said platform in a direction transverse to said path, means for moving said girder parallelly to itself in said direction transverse to said path, a sliding beam parallel to said girder and movable along it in the direction of said path, a carriage mounted on said beam and movable therealong in said direction, means for producing movement of said carriage with respect to said sliding beam and movement of said sliding beam with respect to said girder so that said movements are exclusive of each other, means for locking said beam with respect to said girder as long as said carriage is at one end of said beam, a sliding member movably mounted on said carriage for horizontal rectilinear movement with respect thereto in the direction of said path, two spindles both perpendicular to the direction of said rectilinear movement, one pivoted to said carriage and the other to said sliding member, respectively, both about a common axis parallel to said path, two rollers journalled on said spindles, respectively, and resting on said rail, two holding shoes journalled on said spindles, respectively, said shoes extending from said respective spindles toward each other, each of said shoes having a bearing surface adapted to fit on, and engage, the periphery of a vehicle wheel, the axis of each of said spindles being located at a level lower than that of the top edge of the bearing surface of the corresponding shoe, said top edge being itself at a level lower than that of the axis of such a wheel, and means operative from a distance for displacing said sliding member on said carriage to move said shoes toward each other.

References Cited in the file of this patent

UNITED STATES PATENTS

| | | |
|---|---|---|
| 1,891,795 | Buetell | Dec. 20, 1932 |
| 1,962,127 | Balkema et al. | June 12, 1934 |
| 2,016,662 | Aitken | Oct. 8, 1935 |
| 2,554,984 | Hegel | May 29, 1951 |
| 2,818,186 | Sinclair | Dec. 31, 1957 |